United States Patent
Long et al.

(10) Patent No.: US 8,792,461 B2
(45) Date of Patent: Jul. 29, 2014

(54) METHOD, APPARATUS AND SYSTEM FOR SCHEDULING SERVICE ON MICROWAVE LINK

(75) Inventors: Hao Long, Chengdu (CN); Limin Dong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 104 days.

(21) Appl. No.: 13/403,782

(22) Filed: Feb. 23, 2012

(65) Prior Publication Data

US 2012/0155440 A1   Jun. 21, 2012

Related U.S. Application Data

(63) Continuation of application No. PCT/CN2010/076085, filed on Aug. 18, 2010.

(30) Foreign Application Priority Data

Aug. 24, 2009  (CN) .......................... 2009 1 0163086

(51) Int. Cl.
| | |
|---|---|
| *H04J 3/00* | (2006.01) |
| *H04J 3/18* | (2006.01) |
| *H04L 12/56* | (2006.01) |
| *H04L 12/54* | (2013.01) |
| *H04Q 11/00* | (2006.01) |

(52) U.S. Cl.
CPC .............. *H04L 47/32* (2013.01); *H04L 12/569* (2013.01); *H04L 47/22* (2013.01); *H04Q 11/0001* (2013.01); *H04Q 2011/0033* (2013.01)
USPC ........................................ 370/336; 370/230.1

(58) Field of Classification Search
CPC ........ H04L 47/22; H04L 47/32; H04L 12/569
USPC ..................... 370/235, 336, 412, 545
See application file for complete search history.

(56) References Cited

U.S. PATENT DOCUMENTS 5,612,956 A * 3/1997 Walker et al. ................. 370/545
6,498,865 B1 * 12/2002 Brailean et al. ............... 382/239
(Continued)

FOREIGN PATENT DOCUMENTS

| CN | 1852581 A | 10/2006 |
|---|---|---|
| CN | 101039157 A | 9/2007 |

(Continued)

OTHER PUBLICATIONS

Written Opinion of the International Searching Authority dated Nov. 25, 2010 in connection with International Patent Application No. PCT/CN2010/076085.

(Continued)

*Primary Examiner* — Hoon J Chung
*Assistant Examiner* — Yaotang Wang

(57) ABSTRACT

The embodiments of the present invention relate to the field of microwave communication technologies, and disclose a method, an apparatus, and a system for scheduling a service on a microwave link. In order to overcome the problem that the data unit of the TDM service and the data unit of the packet service cannot be scheduled uniformly in the prior art, the method for scheduling a service on a microwave link provided in the embodiments of the present invention includes: receiving a radio transport unit that carries at least one radio data unit, where the radio data unit carries priority information; and scheduling the radio data unit according to the priority information of the radio data unit. The present invention enables uniform scheduling of the data unit of the TDM service and the data unit of the packet service.

5 Claims, 5 Drawing Sheets

(56) References Cited

U.S. PATENT DOCUMENTS

| | | |
|---|---|---|
| 2002/0075854 A1* | 6/2002 | Kumar et al. ............... 370/352 |
| 2003/0072323 A1 | 4/2003 | Frecassetti et al. |
| 2005/0220148 A1* | 10/2005 | DelRegno et al. ............ 370/498 |
| 2005/0244158 A1* | 11/2005 | Luft ............................. 398/59 |
| 2006/0153126 A1* | 7/2006 | Jung et al. ................... 370/328 |
| 2007/0091808 A1* | 4/2007 | Raftelis ....................... 370/235 |
| 2007/0206545 A1 | 9/2007 | Lee et al. |
| 2007/0230495 A1* | 10/2007 | Li ................................ 370/412 |
| 2007/0297375 A1 | 12/2007 | Bonta et al. |
| 2009/0086664 A1 | 4/2009 | Wu |
| 2009/0116439 A1 | 5/2009 | Madan et al. |

FOREIGN PATENT DOCUMENTS

| | | |
|---|---|---|
| CN | 101478476 A | 7/2009 |
| CN | 101631387 A | 1/2010 |
| WO | WO 2004/010250 A2 | 1/2004 |

OTHER PUBLICATIONS

Translation of Office Action dated Feb. 29, 2012 in connection with Chinese Patent Application No. 200910163086.9.

Supplementary European Search Report dated May 3, 2012 in connection with European Patent Application No. EP 10 81 1232.

Xue Yang, et al., "Priority Scheduling in Wireless Ad Hoc Networks", Wireless Networks 12, Dec. 30, 2005, p. 273-286.

Communication pursuant to Article 94(3) EPC dated Jan. 25, 2013 in connection with European Patent Application No. EP 10 811 232.7.

International Search Report dated Nov. 25, 2010 in connection with International Patent Application No. PCT/CN2010/076085.

* cited by examiner

METHOD, APPARATUS AND SYSTEM FOR SCHEDULING SERVICE ON MICROWAVE LINK

CROSS-REFERENCE TO RELATED APPLICATIONS

This application is a continuation of International Application No. PCT/CN2010/076085, filed on Aug. 18, 2010, which claims priority to Chinese Patent Application No. 200910163086.9, filed on Aug. 24, 2009, both of which are hereby incorporated by reference in their entireties.

TECHNICAL FIELD

The present invention relates to the field of microwave communication technologies, and in particular, to a method, an apparatus, and a system for scheduling a service on a microwave link.

BACKGROUND

Currently, microwaves are widely applied in the operator network. Frequently used microwaves are SDH (Synchronous Digital Hierarchy, Synchronous Digital Hierarchy) microwaves and PDH (Plesiochronous Digital Hierarchy, Plesiochronous Digital Hierarchy) microwaves; the microwaves are mainly used to transmit TDM (Time Division Multiplexing, time division multiplexing) services. However, with increase of packet services, more traffic occupies the network of the operator, and the required bandwidth increases steeply. Under such circumstances, the transmitted PDH microwaves and SDH microwaves will be gradually replaced by hybrid microwaves for lack of proper support of the packet service. The hybrid microwaves employs a quasi-SDH timeslot encapsulation mode for the TDM service, e.g., E1 service; and employs a GFP encapsulation mode for packet services. When the TDM service and the packet service need to be sent, the hybrid microwaves place together the data units that are encapsulated in two different types of modes. The data units are combined with overhead and FEC into a complete microwave frame, and then modulated and sent out.

In the process of implementing the present invention, the inventor finds at least the following technical problems in the prior art: the hybrid microwaves apply different data encapsulation modes for the TDM service data and the packet service data, so that the microwave interface node is unable to uniformly schedule the data unit of the TDM service and the data unit of the packet service in the process of transmitting the service data.

SUMMARY

Embodiments of the present invention provide a method, an apparatus, and a system for scheduling a service on a microwave link to implement uniform scheduling for data units of a TDM service and a packet service. The embodiments of the present invention adopt the following technical solutions:

In one aspect, an embodiment of the present invention provides a method for scheduling a service on a microwave link, including:

receiving a radio transport unit that carries at least one radio data unit, where the radio data unit carries priority information; and scheduling the radio data unit according to the priority information of the radio data unit.

In another aspect, an embodiment of the present invention provides a method for scheduling a service on a microwave link, including:

receiving service data;

encapsulating the received service data into a radio data unit that carries priority information of the service data;

encapsulating the radio data unit into a radio transport unit to form a complete microwave frame; and sending the microwave frame.

In still another aspect, an embodiment of the present invention provides an apparatus for scheduling a service on a microwave link, including:

a receiving unit, configured to receive a radio transport unit that carries at least one radio data unit, where the radio data unit carries priority information; and a scheduling unit, configured to schedule the radio data unit according to the priority information of the radio data unit.

In yet another aspect, an embodiment of the present invention provides an apparatus for scheduling a service on a microwave link, including:

a data receiving unit, configured to receive service data;

a data encapsulating unit, configured to: encapsulate the received service data into a radio data unit that carries priority information of the service data; and encapsulate the radio data unit into a radio transport unit to form a complete microwave frame; and a sending unit, configured to send the microwave frame.

In still another aspect, an embodiment of the present invention provides a system for scheduling a service on a microwave link, including: a transmitting-side service scheduling apparatus, configured to receive service data, encapsulate the received service data into a radio data unit that carries priority information of the service data, encapsulate the radio data unit into a radio transport unit to form a complete microwave frame, and send the microwave frame; and a receiving-side service scheduling apparatus, configured to receive the radio transport unit, and schedule the radio data unit according to the priority information of the radio data unit.

According to the method, apparatus and system for scheduling a service on a microwave link provided in the embodiments of the present invention, the radio transport unit that carries at least one radio data unit is received, where the radio data unit carries the priority information; and the radio data unit is scheduled according to the priority information of the radio data unit. In this way, the priority of the radio data unit can be determined according to the priority information carried in the radio data unit, and corresponding uniform scheduling can be performed for the radio data unit according to different priorities.

DETAILED DESCRIPTION

The following gives details about a method, an apparatus and a system for scheduling a service on a microwave link in embodiments of the present invention with reference to accompanying drawings.

Figure 1:
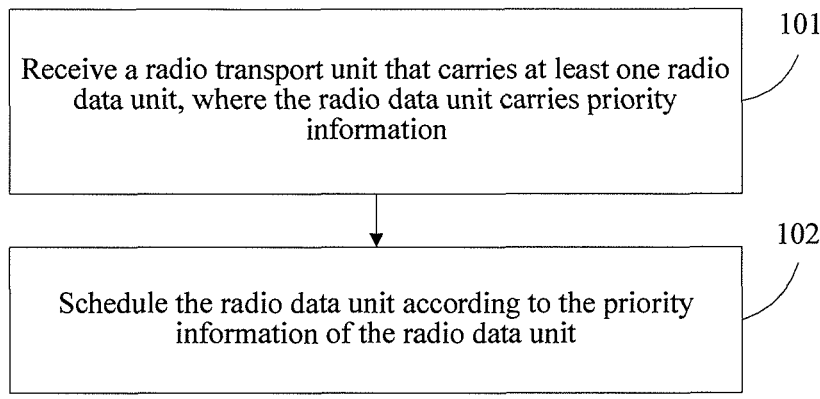
FIG. 1 is a flowchart of a method for scheduling a service on a microwave link according to an embodiment of the present invention.

As shown in FIG. 1, FIG. 1 shows a method for scheduling a service on a microwave link according to an embodiment of the present invention. The method includes the following steps:

101. Receive a radio transport unit that carries at least one radio data unit, where the radio data unit carries priority information. Specifically, after a node with a microwave interface receives the radio transport unit that carries the at least one radio data unit that carries the priority information, a priority of the radio data unit may be determined according to the carried priority information.

The radio data unit can carry data of both TDM service and packet service. The radio data unit may further include one or any combination of a preamble, a service label, information about length of the radio data unit, service type information, overhead information, payload. That is, the TDM service and the packet service may employ an encapsulation method of the radio data unit.

102. Schedule the radio data unit according to the priority information of the radio data unit.

Specifically, the node with the microwave interface determines the priority of the radio data unit according to the priority information, and then schedules the radio data unit according to the priority information; when the radio data unit further carries the service type information, the radio data unit may be scheduled according to a service type and the priority. The following example describes how a radio data unit is scheduled for a TDM service or packet service. When the available bandwidth of a microwave link is insufficient, if the service type of the radio data unit of a lower priority is the TDM service, the payload in the radio data unit of the lower priority is discarded and a discard identifier is set, or the radio data unit that carries the discard identifier is served as the radio data unit with the lowest priority to be discarded. Because random discarding of a packet is unacceptable to the TDM service, it is required to record the service label of the radio data unit on which discarding processing is performed, when the radio data unit to be discarded is a radio data unit whose service type is the TDM service, so that the radio data unit that carries the service label is continued to be discarded when it is required to perform further discarding processing.

If the service type of the radio data unit of the lower priority is the packet service, the radio data unit of the lower priority is discarded, or the payload of the radio data unit of the lower priority is discarded and a discard identifier is set.

When the available bandwidth of the microwave link recovers, more data is added to the transmission data unit to recover a transmission data rate according to the length information of the radio data unit to be added. For example, when service data encapsulated in the radio data unit to be added is kind of the TDM service, the data of the corresponding length is added according to the length information of the radio data unit, and AIS alarm information is set; when service data encapsulated in the radio data unit to be added is kind of the packet service, AIS alarm information is set, and the length of the radio data unit is modified; or AIS alarm information is set, and the data of the corresponding length is added.

According to the method for scheduling a service on a microwave link provided in this embodiment of the present invention, the radio transport unit that carries at least one radio data unit is received, where the radio data unit carries the priority information; and the radio data unit is scheduled according to the priority information of the radio data unit. In this way, the node with the microwave interface can determine the priority of the radio data unit according to the priority information carried in the radio data unit after the node receives the radio data unit that carries the priority information and is kind of the TDM service and the radio data unit that carries the priority information and is kind of the packet service; and radio data units are scheduled uniformly according to different priorities. The radio data unit in this embodiment of the present invention may further carry the service type information, and therefore, the radio data unit can be adjusted correspondingly according to the carried service type information and priority information.

Figure 2:
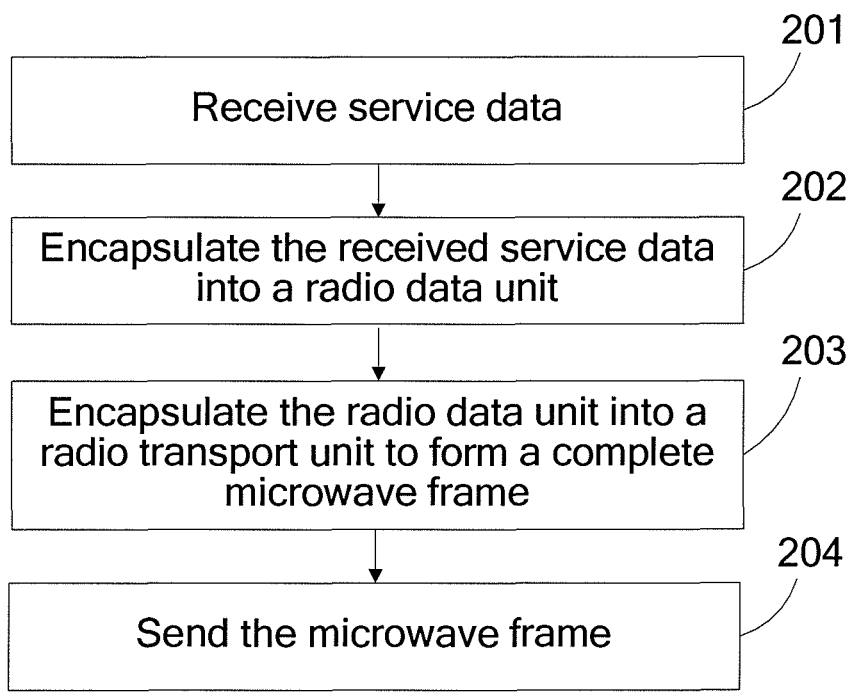
FIG. 2 is a flowchart of a method for scheduling a service on a microwave link according to an embodiment of the present invention when a node with a microwave interface receives a TDM service and a packet service from an attached circuit.

As shown in FIG. 2, FIG. 2 is a flowchart of another method for scheduling a service on a microwave link according to an embodiment of the present invention. When a node with a microwave interface receives a TDM service and a packet service from an attached circuit, the method includes the following steps:

201. Receive service data.

Figure 3:
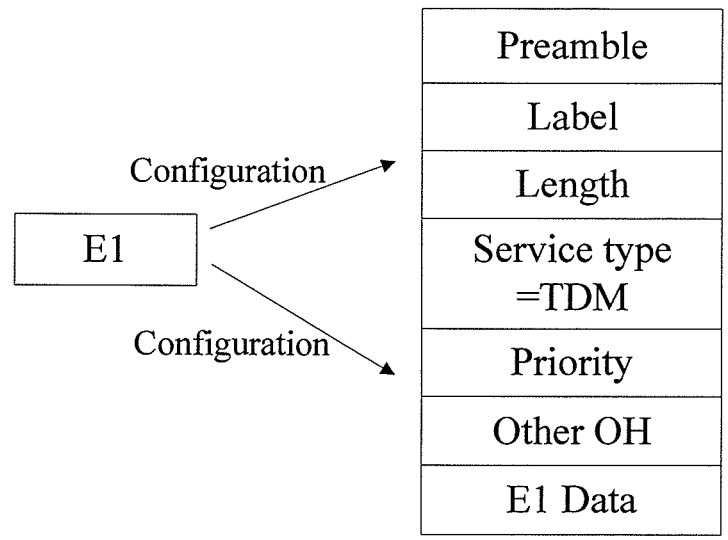
FIG. 3 is a schematic structural diagram of a radio data unit (RDU) that encapsulates an E1 data stream of a TDM service according to an embodiment of the present invention.
Figure 4:
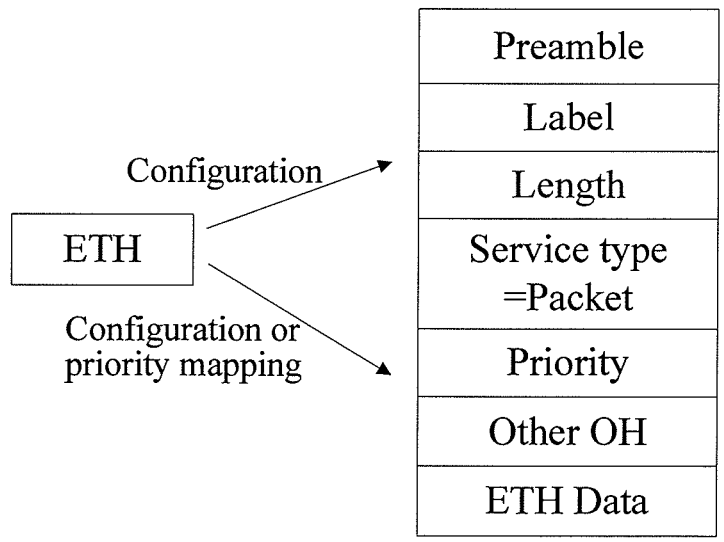
FIG. 4 is a schematic structural diagram of a radio data unit (RDU) that encapsulates an ETH packet of a packet service according to an embodiment of the present invention.

202. Encapsulate the received service data into a radio data unit that carries priority information of the service data. The radio data unit may further include one or any combination of a preamble, a service label, information about length of the radio data unit, service type information, overhead (OH) information, or payload data. As shown in FIG. 3, FIG. 3 is a schematic structural diagram of a radio data unit (RDU) that encapsulates an E1 data stream of a TDM service; and as shown in FIG. 4, FIG. 4 is a schematic structural diagram of a radio data unit (RDU) that encapsulates an Ethernet (ETH) packet of a packet service.

Figure 8:
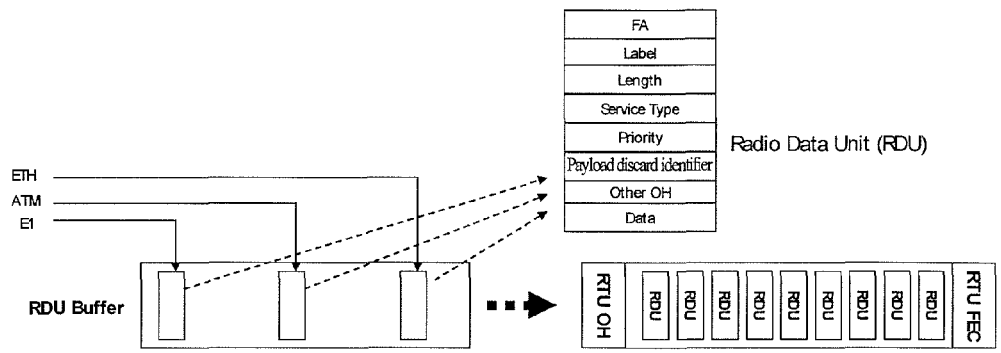
FIG. 8 is a flowchart of forming a microwave frame in another method for scheduling a service on a microwave link according to an embodiment of the present invention.

203. Encapsulate the radio data unit into a radio transport unit to form a complete microwave frame. Specifically, as shown in FIG. 8, the radio data unit is buffered into a radio data unit buffer; and the radio data unit buffered in the radio data unit buffer is encapsulated into the radio transport unit according to the priority information carried by the radio data unit, so as to form the complete microwave frame.

204. Send the microwave frame.

According to the method for scheduling a service on a microwave link provided in this embodiment of the present invention, the received service data can be encapsulated into the radio data unit that carries the priority information of the service data; and the radio data unit may further include one or any combination of the preamble, the service label, the length information of the radio data unit, the service type information, the overhead information, or the payload. In this way, the node with the microwave interface can encapsulate the received service data into the radio data unit upon receiving the service data, encapsulate the radio data unit into the radio transport unit to form the complete microwave frame, and send the microwave frame to a next node. Therefore, the TDM service and the packet service employ the same encapsulation mode, so as to uniformly schedule the service data subsequently.

Figure 5:
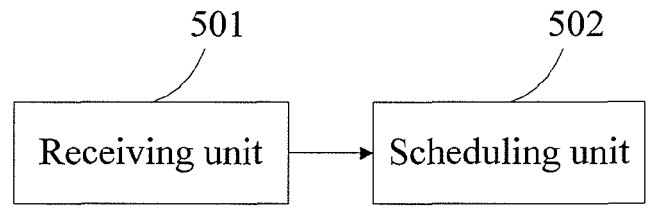
FIG. 5 is a schematic structural diagram of an apparatus for scheduling a service on a microwave link according to an embodiment of the present invention.

As shown in FIG. 5, an apparatus for scheduling a service on a microwave link provided according to an embodiment of the present invention includes:

a receiving unit 501, configured to: receive a radio transport unit that carries at least one radio data unit, where the radio data unit carries priority information and further includes one or any combination of a preamble, a service label, information about length of the radio data unit, service type information, overhead information, or payload; and a scheduling unit 502, configured to schedule the radio data unit according to the priority information of the radio data unit. The scheduling unit includes:

a priority determining sub-unit, configured to determine a radio data unit of a lower priority according to the priority information; and a discarding unit, configured to discard the radio data unit of the lower priority when the available bandwidth of the microwave link is insufficient. The discarding processing includes: discarding the radio data unit; or discarding the payload of the radio data unit and reserving overhead; or discarding the payload of the radio data unit, reserving the overhead, and setting a discard identifier in the overhead.

When the radio data unit carries the service type information and priority information, the scheduling unit further includes:

a type determining sub-unit, configured to determine a service type of the radio data unit according to the service type information of the radio data unit;

the discarding sub-unit is configured to discard the radio data unit of the lower priority according to the priority information and the service type when the available bandwidth of the microwave link is insufficient, and specifically, if the service type of the radio data unit of the lower priority is a TDM service, the discarding sub-unit discards the payload in the radio data unit of the lower priority and sets the discard identifier, or discards the radio data unit that carries the discard identifier and serves as a radio data unit with the lowest priority; if the service type of the radio data unit of the lower priority is a packet service, the discarding sub-unit discards the radio data unit of the lower priority, or discards the payload of the radio data unit of the lower priority and sets the discard identifier.

If the service type of the radio data unit of the lower priority is the TDM service, specifically, the scheduling unit may further include:

a recording sub-unit, configured to record the service label of the radio data unit on which discarding processing is performed, so that the radio data unit that carries the service label is continued to be discarded when it is required to perform further discarding processing.

When the available bandwidth of the microwave link recovers, specifically, the scheduling unit further includes:

a data adding sub-unit, configured to add data of corresponding length to recover the transmission rate according to the length information of the radio data unit, and specifically, when service data encapsulated in the radio data unit to which the data needs to be added is kind of the TDM service, add the data of the corresponding length according to the length information of the radio data unit, and set AIS alarm information; when service data encapsulated in the radio data unit to which the data needs to be added is kind of the packet service, set AIS alarm information, and modify the length of the radio data unit; or set AIS alarm information, and add the data of the corresponding length.

According to the method for scheduling a service on a microwave link provided in this embodiment of the present invention, the radio transport unit that carries at least one radio data unit is received, where the radio data unit carries the priority information; and the radio data unit is scheduled according to the priority information of the radio data unit. In this way, the node with the microwave interface can determine the priority of the radio data unit according to the priority information carried in the radio data unit after the node receives the radio data unit that carries the priority information and is kind of the TDM service and the radio data unit that carries the priority information and is kind of the packet service; and radio data units are scheduled uniformly according to different priorities. The radio data unit in this embodiment of the present invention may further carry the service type information, and therefore, the radio data unit can be adjusted correspondingly according to the carried service type information and priority information.

Figure 6:
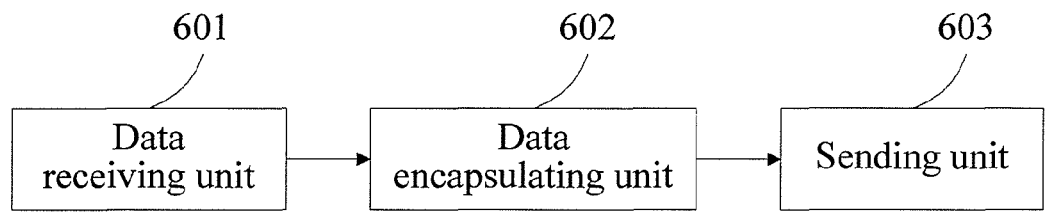
FIG. 6 is a schematic structural diagram of another apparatus for scheduling a service on a microwave link according to an embodiment of the present invention.

As shown in FIG. 6, FIG. 6 shows an apparatus for scheduling a service on a microwave link according to an embodiment of the present invention. When a node with a microwave interface receives a TDM service and a packet service from an attached circuit, the apparatus may further include:

A data receiving unit 601, which is configured to receive service data.

A data encapsulating unit 602, which is configured to: encapsulate the received service data into a radio data unit that carries priority information of the service data; and encapsulate the radio data unit into a radio transport unit to form a complete microwave frame.

The radio data unit may further include one or any combination of a preamble, a service label, information about length of the radio data unit, service type information, overhead information, or payload.

A sending unit 603, which is configured to send the microwave frame.

The data encapsulating unit 602 specifically includes:

a buffering sub-unit, configured to buffer the radio data unit into a radio data unit buffer; and a frame encapsulating sub-unit, configured to encapsulate the radio data unit buffered in the radio data unit buffer into the radio transport unit according to the priority information carried by the radio data unit, so as to form the complete microwave frame.

According to the apparatus for scheduling a service on a microwave link provided in this embodiment of the present invention, the received service data can be encapsulated into the radio data unit, and the radio data unit can be encapsulated into the radio transport unit to form the complete microwave frame. The radio data unit carries the priority information of the service data, and the radio data unit may further include one or any combination of the preamble, the service label, the length information of the radio data unit, the service type information, the overhead information, or the payload. In this way, the node with the microwave interface can encapsulate the received service data into the radio data unit upon receiving the service data, encapsulate the radio data unit into the radio transport unit to form the complete microwave frame, and send the microwave frame to a next node. Therefore, the TDM service and the packet service employ the same encapsulation mode, so as to uniformly schedule the service data subsequently.

Figure 7:
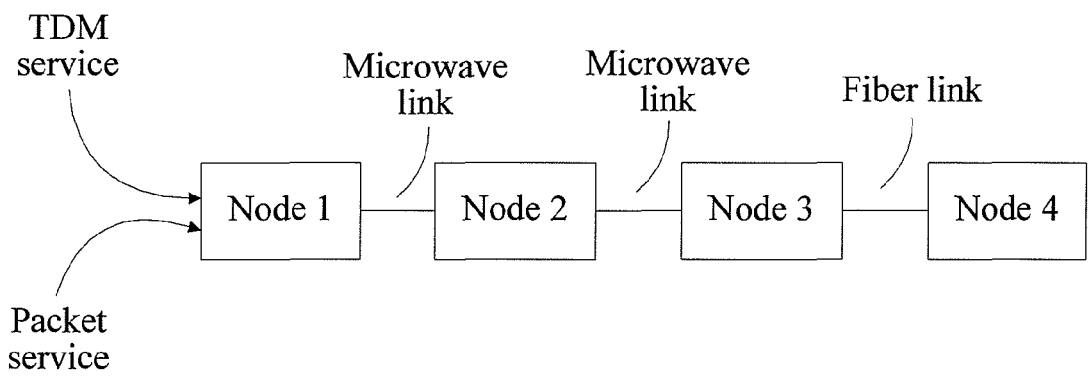
FIG. 7 is a flowchart of another method for scheduling a service on a microwave link according to an embodiment of the present invention.

As shown in FIG. 7, FIG. 7 is a method for scheduling a service on a microwave link according to an embodiment of the present invention. An example that four nodes exist on the microwave link is taken for specific illustration; node 1, node 2, and node 3 have microwave interfaces; node 3 and node 4 have fiber interfaces; a microwave link exists between node 1 and node 2; a microwave link exists between node 2 and node 3; and a fiber link exists between node 3 and node 4.

It is assumed that node 1 receives TDM services and packet services from attached circuits, and the following takes an E1 service as an example of the TDM service, and takes an Ethernet service as an example of the packet service.

(1) Node 1 encapsulates an E1 service data stream and an Ethernet service data packet into radio data units (RDUs). As shown in FIG. 3, FIG. 3 is a schematic structural diagram of a radio data unit (RDU) that encapsulates an E1 service data stream, and as shown in FIG. 4, FIG. 4 is a schematic structural diagram of a radio data unit (RDU) that encapsulates an Ethernet service data packet. The radio data unit includes service type information and priority information, and may further include one or any combination of a preamble, a service label, information about length of the radio data unit, overhead information, or payload. The preamble (PA, Preamble) is used for delimiting RDUs; Label is the service label and is used for identifying a service, and, in a multi-hop scenario, may be further used for label switching; Length is the length information of the RDU and is used for indicating the length of the RDU; Priority is the priority information and is used for QoS scheduling; Service Type is the service type information and is used for indicating a service type such as TDM or Packet; the service type information may be used for QoS scheduling, for example, for the TDM service type, a fixed discarding policy is applied; Other OH refers to other overhead, and includes a sequence number; and payload Data is an E1 bit stream or ETH data block.

(2) Node 1 buffers an encapsulated radio data unit into a radio data unit buffer.

(3) According to the priority information carried by the radio data unit, node 1 encapsulates the radio data unit buffered in the radio data unit buffer into a radio transport unit to form a complete microwave frame. A specific process of forming the microwave frame is shown in FIG. 8, firstly, a generated RDU is put into an RDU buffer, and a RDU scheduling unit may select at least one RDU according to QoS scheduling, puts the selected RDU into the payload of the radio transport unit (RTU, Radio transport unit), and adds the RTU overhead and FEC to form the complete microwave frame. The RTU overhead includes a delimiter and some management overhead.

(4) Node 1 sends the microwave frame to node 2. Node 1 may send the microwave frame to node 2 in a synchronous or asynchronous mode. The synchronous mode is: The node sends the certain number of frames per second on the microwave interface, such as 8000 frames per second, and adjusts a transmitting rate by adjusting frame length; and the asynchronous mode is: The node sends a fixed-length frame on the microwave interface, for example, sends a frame with a fixed length of 16 Kbits, and adjusts the transmitting rate by adjusting frame frequency.

Figure 9:
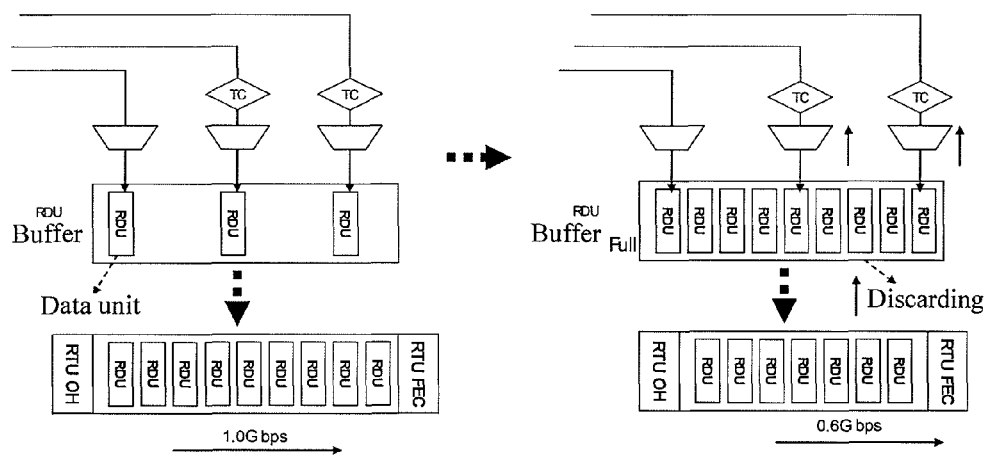
FIG. 9 is a discarding flowchart in a method for scheduling a service on a microwave link according to an embodiment of the present invention.
Figure 10:
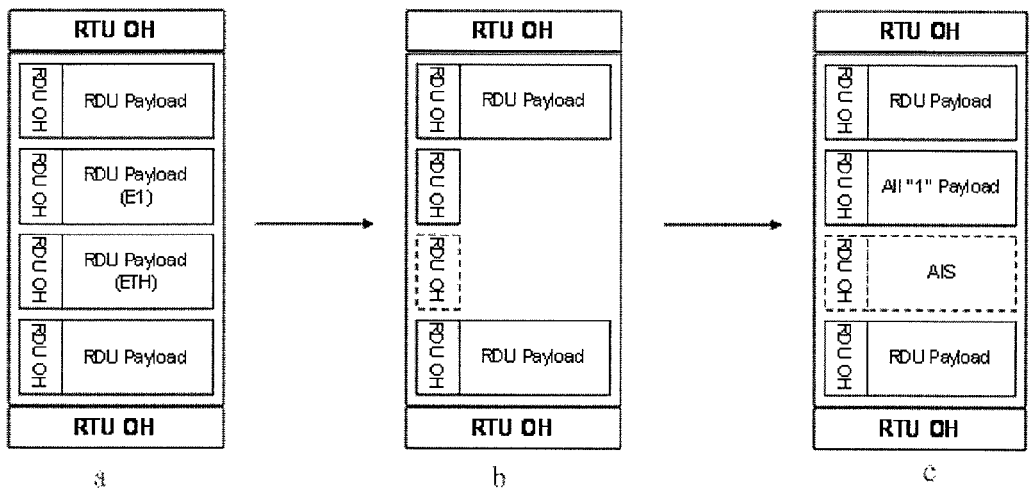
FIG. 10 is a flowchart of another method for scheduling a service on a microwave link according to an embodiment of the present invention.

After receiving a microwave frame sent by node 1 or another node, node 2 needs to decapsulate the RTU overhead and an FEC code first, namely, retrieve the RDU out of the microwave frame; and then node 2 switches the RDU to an egress port according to the service label carried in the RDU, and, if the RDU is in the multi-hop scenario, the RDU needs to perform label switching; finally, through the QoS scheduling, the RDU is encapsulated into the RTU again at the egress port to form the complete microwave frame, and the microwave frame is sent to a next node, namely, node 3. When the environment of the microwave link between node 2 and node 3 changes, for example, in a rainy day, node 2 and node 3 start adaptive modulation, and therefore, available bandwidth decreases from 1.0 Gbps to 0.6 Gbps. In this way, the size of an RTU container in node 2 may decrease, for example, decrease from 16 K to 10 K, and the number of RDUs containable in the container decreases. As shown in FIG. 9, the traffic of the RDU is too large, and discarding processing needs to be performed for the RDU when the RDU buffer is full. The discarding processing is based on the priority information and service type information that are carried in the RDU. In the following discarding processing in a QoS scheduling process in which the microwave frame is sent in the synchronous mode, it is assumed that an RTU can contain 4 RDUs normally. When the available bandwidth decreases, the RTU can contain 2 RDUs, namely, the microwave frame can carry only two RDUs. In this way, node 2 performs the QoS scheduling for the microwave frame from a to b as shown in FIG. 10, the detailed procedure is:

(5) Node 2 receives an RTU from node 1 or another node, where the RTU includes 4 RDUs.

(6) When node 2 determines that current available bandwidth allows each RTU to carry only 2 RDUs, node 2 finds out two RDUs with the lowest priority according to the priority information in the RDU in the received RTU.

(7) Discard the two RDUs with the lowest priority; or discard only service data of the payload of the two RDUs with the lowest priority and reserve the RDU overhead, and set the discard identifier Payload in the RDU overhead to 1.

It should be noted that when the discarded RDU is kind of the TDM service type, node 2 needs to record the service label of the radio data unit (RDU) on which the discarding processing is performed, so that the radio data unit that carries the service label is continued to be discarded when further discarding processing is required to be performed. That is, when a network congestion condition is not improved, node 2 discards the RDU as the radio data unit with the lowest priority if node 2 receives next time the RDU that carries the same service label as the recorded service label. That is because random discarding is not suitable for TDM service.

It should be further noted that when the discarded RDU is kind of the TDM service type, TDM service overhead in the RDU payload may be reserved at the time of the discarding.

After node 3 receives the microwave frame sent by node 2 or another node on the microwave link, node 3 determines that the environment of the microwave link returns to normal, namely, the available bandwidth returns to normal, and therefore, node 3 performs the QoS scheduling for the microwave frame from b to c as shown in FIG. 10. The detailed procedure is as follows:

(8) Node 3 receives an RTU from node 2 or another node, where the RTU includes 2 RDUs.

(9) When node 3 judges that the current available bandwidth allows each RTU to carry 4 RDUs, node 3 adds data of corresponding length according to the length information of the discarded RDU in the received RTU, so as to recover the transmission rate. For example, when the received RTU carries only two RDUs and information about the overhead of discarding the RDU is not reserved, node 3 encapsulates the received two RDUs into a current RTU according to capacity of the current RTU that can contain 4 RDUs, and sets remaining space of the RTU to 1 or 0, and generates AIS alarm information, where the AIS alarm information is used to instruct a next receiving node to discard the RDU; when the received RTU carries only two RDUs and the overhead of discarding the RDU is reserved, node 3 adds the data of the corresponding length according to the length information of the radio data unit (RDU) in the information about the overhead of discarding the RDU, namely, sets the payload of the discarded RDU to 1, and generates AIS alarm information, where the AIS alarm information is used to instruct a next receiving node to discard the RDU so as to recover the transmission rate of the network. Specifically, when the discarded RDU is the payload of the TDM service and the transmission rate of the network needs to be recovered, node 3 adds the payload of the TDM service to 1 according to the length information of the discarded RDU, and generates an AIS alarm; when the discarded RDU is the RDU payload of the packet service and the transmission rate of the network needs to be recovered, node 3 modifies the length of the RDU, and generates an AIS alarm.

Node 3 sends the RDU to node 4 through the fiber link.

It should be noted that the RDU packages such as AIS alarm indication and the discard identifier information may be carried in the reserved bytes in GFP or GEM, and therefore, no format conversion or re-encapsulation is required when node 3 sends the RDU to node 4 through a fiber link.

It should be further noted that node 1, node 2, and node 3 with microwave interfaces can receive TDM services and packet services from an attached circuit and encapsulate the services uniformly; and can adjust the size of the RTU container adaptively according to the available bandwidth of the microwave link between nodes, so as to perform the QoS scheduling. If the RDU is kind of the TDM service type, a fixed discarding scheduling policy is applied, namely, every discarded RDU is the RDU of the same service label; if the RDU is kind of the packet service, the discarding is performed according to the priority information of the RDU.

Figure 11:
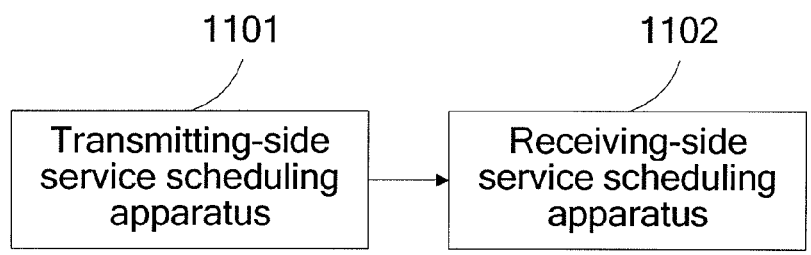
FIG. 11 is a schematic structural diagram of a system for scheduling a service on a microwave link according to an embodiment of the present invention.

As shown in FIG. 11, FIG. 11 shows a system for scheduling a service on a microwave link according to an embodiment of the present invention. The system includes:

a transmitting-side service scheduling apparatus 1101, configured to receive service data, encapsulate the received service data into a radio data unit that carries priority information of the service data, encapsulate the radio data unit into a radio transport unit to form a complete microwave frame, and send the microwave frame; and a receiving-side service scheduling apparatus 1102, configured to receive the radio transport unit, and schedule the radio data unit according to the priority information of the radio data unit.

According to the method, apparatus and system for scheduling a service on a microwave link provided in the embodiments of the present invention, the radio data unit that carries the priority information and/or the service type information is received; and the radio data unit is scheduled according to the priority information and/or the service type information of the radio data unit. Besides, the embodiments of the present invention can encapsulate the received service data into the radio data unit that carries the priority information of the service data; the radio data unit may further include one or any combination of the preamble, the service label, the length information of the radio data unit, the service type information, the overhead information, or the payload. In this way, the node with the microwave interface can encapsulate the received service data into the radio data unit upon receiving the service data, use the radio data unit to form the microwave frame, and send the microwave frame to the next node; upon receiving the radio data unit that carries the priority information and service type information, the node with the microwave interface can determine a priority of the radio data unit according to the priority information carried in the radio data unit; and moreover, different services can be distinguished according to the carried service type information, and radio data units can be scheduled correspondingly according to different priorities and service types.

Through the descriptions of the above embodiments, persons of ordinary skill in the art should understand that all or part of the steps of the method specified in any embodiment above may be implemented by a program instructing relevant hardware. The program may be stored in computer-readable storage media such as ROM/RAM, magnetic disk or CD-ROM. When the program runs, the program executes the steps of the method specified in any embodiment above.

The above descriptions are merely exemplary embodiments of the present invention, but not intended to limit the protection scope of the present invention. Any modification, variation or replacement that can be easily derived by those skilled in the art shall fall within the protection scope of the present invention. Therefore, the protection scope of the present invention is subject to the appended claims.

What is claimed is:

1. A method for scheduling a service on a microwave link, the method comprising:

receiving a radio transport unit that carries at least one radio data unit (RDU), wherein the RDU carries service type information, priority information and a service label;

determining a service type of the RDU according to the service type information of the RDU, wherein the service type of the RDU is Time Division Multiplexing (TDM) service type or packet service type;

discarding a payload part and reserving overhead of an RDU of a lower priority according to the priority information and the service type when available bandwidth of the microwave link is insufficient; and when the service type of the RDU of the lower priority is TDM service type, recording a service label of the RDU on which discarding processing is performed, so that an RDU that carries the service label is continued to be discarded when it is required to perform further discarding processing.

2. The method for scheduling a service on a microwave link according to claim 1, wherein:

when available bandwidth of the microwave link recovers, adding data of corresponding length according to information about length carried in overhead of a discarded RDU to recover a transmission rate of a network.

3. An apparatus for scheduling a service on a microwave link, the apparatus comprising:

a receiving unit, configured to receive a radio transport unit that carries at least one radio data unit (RDU), wherein the RDU carries service type information, priority information and a service label; and a scheduling unit configured to determine a service type of the RDU according to the service type information of the RDU, wherein the service type of the RDU is Time Division Multiplexing (TDM) service type or packet service type, discarding a payload part and reserving overhead of an RDU of a lower priority according to the priority information and the service type when available bandwidth of the microwave link is insufficient, and when the service type of the RDU of the lower priority is TDM service type, recording a service label of the RDU on which discarding processing is performed, so that an RDU that carries the service label is continued to be discarded when it is required to perform further discarding processing.

4. The apparatus for scheduling a service on a microwave link according to claim 3, wherein the scheduling unit further comprises:
a data adding sub-unit, configured when available bandwidth of the microwave link recovers, adding data of corresponding length according to information about length carried in overhead of a discarded RDU to recover a transmission rate of a network.

5. A system for scheduling a service on a microwave link, comprising:
a transmitting-side service scheduling apparatus, configured to receive service data, encapsulate the received service data into a radio data unit (RDU) that carries service type information, priority information and a service label, encapsulate the RDU into a radio transport unit to form a complete microwave frame, and send the microwave frame to a receiving-side service scheduling apparatus according to claim 3.

\* \* \* \* \*